United States Patent [19]

Araki et al.

[11] 4,199,554
[45] Apr. 22, 1980

[54] METHOD OF AND APPARATUS FOR REMOVING NITROGEN OXIDES FROM THE GASES CONTAINING NITROGEN OXIDES

[75] Inventors: Tadashi Araki; Hatsuo Säito; Maseyuki Funabashi; Ritaro Saito, all of Iwaki; Koji Seguchi, Tokyo, all of Japan

[73] Assignee: Kureha Kagaki Kogyo Kabushiki Kaisha, Tokyo, Japan

[21] Appl. No.: 866,042

[22] Filed: Dec. 30, 1977

[30] Foreign Application Priority Data

Jan. 21, 1977 [JP] Japan .................................. 52-5522
Mar. 31, 1977 [JP] Japan .................................. 52-36735

[51] Int. Cl.$^2$ .......................................... B01D 53/00
[52] U.S. Cl. ................................. 423/239; 252/411 R
[58] Field of Search ................ 252/411; 423/235, 239, 423/376

[56] References Cited

U.S. PATENT DOCUMENTS

| | | | |
|---|---|---|---|
| 2,006,981 | 7/1935 | Andrussow | 423/376 |
| 3,162,506 | 12/1964 | Delassus et al. | 423/403 |
| 3,864,451 | 2/1975 | Lee et al. | 423/239 A |
| 3,911,089 | 10/1975 | Shiraishi et al. | 423/376 |
| 3,970,739 | 7/1976 | Shiraishi et al. | 423/235 |
| 4,043,939 | 8/1977 | Kasaoka | 252/411 S |

FOREIGN PATENT DOCUMENTS 918300  2/1963  United Kingdom ................... 423/239

*Primary Examiner*—G. O. Peters
*Attorney, Agent, or Firm*—Stevens, Davis, Miller & Mosher

[57] ABSTRACT

Disclosed herein is a method of removing the nitrogen oxides from the gases containing nitrogen oxides by contacting any such gas with ammonia at a temperature of from 100° C. to 230° C. in the presence of a catalyst so that a reaction takes place between the nitrogen oxides and ammonia. This reaction is conducted in such a manner as to prevent the by-produced ammonium nitrate from depositing on the catalyst. There is also disclosed a specific apparatus for practicing the method.

24 Claims, 3 Drawing Figures

METHOD OF AND APPARATUS FOR REMOVING NITROGEN OXIDES FROM THE GASES CONTAINING NITROGEN OXIDES

FIELD OF THE INVENTION

This invention relates to the improvements in the method of removing the nitrogen oxides (hereinafter referred to as $NO_x$) from the $NO_x$-containing gases by reducing $NO_x$ with ammonia in the presence of a catalyst, and an apparatus therefor.

BACKGROUND OF THE INVENTION

Various methods are known for removing $NO_x$ from the $NO_x$-containing exhaust gases such as released combustion gas, and among such known methods, the so-called catalytic reduction method using ammonia as reducer is credited with high utility for its unchanged effectiveness even in the treatment of discharge gases with relatively high concentrations of $NO_x$ and/or oxygen. According to this method, the $NO_x$-containing gas is contacted with ammonia in the presence of a catalyst at a catalyst-activated temperature to effect a reaction between $NO_x$ and ammonia to thereby transform $NO_x$ into $N_2$. The temperature at which the catalyst is activated varies depending on the kind of the catalyst used. Although many of the catalysts of the type usable in this method become active at a temperature of 200° to 400° C., there are some which show a very high activity at a relatively low temperature, such as 100° to 230° C. From the industrial viewpoint, it is preferred to practice the method by using a catalyst which is activated at a low temperature.

Generally, when a $NO_x$-containing discharge gas is contacted with ammonia to let $NO_x$ react with ammonia, there is by-produced ammonium nitrate. This ammonium nitrate is thermally decomposed at a temperature higher than 230° C., but it is scarcely decomposed at a lower temperature and deposits on the catalyst layers to badly affect the catalyst activity. Therefore, it has been hardly feasible to industrially perform the reaction at a temperature below 230° C. in spite of many advantages such as smaller energy loss or reduced poisoning by $SO_2$ when such element is contained in the discharge gas.

SUMMARY OF THE INVENTION

The object of this invention, therefore, is to provide a method of catalytic reduction of $NO_x$ with ammonia at a low temperature without inviting decline of the catalyst activity due to by-production of ammonia nitrate, and an apparatus for practicing such method.

This and other objects and features of this invention will become more apparent from a review of the following description of the invention.

We have found that when a $NO_x$-containing gas is contacted with ammonia at a temperature lower than 230° C. in the presence of a catalyst to effect a reaction between $NO_x$ and ammonia, it is possible to prevent deposition of by-produced ammonium nitrate on the catalyst by constantly or intermittently introducing a specific substance into the mixed gas (mixture of $NO_x$-containing gas and $NH_3$). We also have found that when reacting $NO_x$ with ammonia in a reactor at a temperature lower than 230° C. in the presence of a catalyst by introducing a $NO_x$-containing gas and ammonia into the reactor, deposition of by-produced ammonium nitrate on the catalyst can be prevented by temporarily stopping introduction of the $NO_x$-containing gas and ammonia into the reactor while introducing a specific substance into the reactor during such time and repeating this procedure successively. This invention has been attained on the basis of these findings.

Thus, according to the present invention, there is provided a method of removing $NO_x$ from a $NO_x$-containing gases by contacting the $NO_x$-containing gas with ammonia at a temperature of from 100° to 230° C. in the presence of a catalyst to effect a reaction between $NO_x$ and ammonia, characterized by the idea of constantly or intermittently introducing a substance capable of decomposing ammonium nitrate into the mixture gas of $NO_x$-containing gas and ammonia. It is also intended in this invention to provide a method of removing $NO_x$ from a $NO_x$-containing gas by introducing the $NO_x$-containing gas and ammonia into a reactor to effect a reaction between $NO_x$ and ammonia at a temperature of from 100° to 230° C. in the presence of a catalyst in the reactor, characterized by (1) temporarily stopping, partially, the introduction of the $NO_x$-containing gas and ammonia into the reactor while introducing instead a substance capable of decomposing ammonium nitrate, and (2) repeating this operation successively.

This invention also provides an apparatus for removing $NO_x$ from a $NO_x$-containing gases by reacting $NO_x$ with ammonia at a temperature of from 100° to 230° C. in the presence of a catalyst, the apparatus including a reactor provided with at least two catalyst layers each of which is disposed alongside a gas introducing passage at one side and a gas discharging passage at the other side, each of the gas introducing passages being provided with a door at its gas inlet and closed on its gas discharge side while each of the gas discharging passages being closed on its gas inlet side and provided with a door at its gas outlet, each of the gas passages being also provided with at least one inlet opening for a substance capable of decomposing ammonium nitrate.

DETAILED DESCRIPTION OF THE INVENTION

Figure 1:
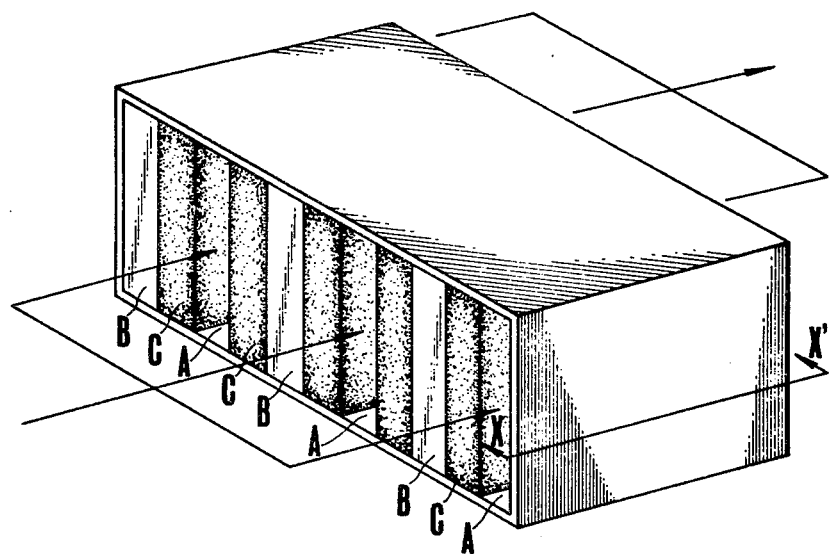
FIG. 1 is a perspective view of a preferred embodiment of the apparatus according to this invention.

The "substance capable of decomposing ammonium nitrate" used in this invention may be of any type if it is capable of decomposing ammonium nitrate at a temperature of from 100° to 230° C. Such substance is used in a gaseous state in this invention. This substance may, for instance, be an oxygen-containing derivative of a lower hydrocarbon, such as for example an alcohol, a carboxylic acid, an aldehyde, a ketone, an oxide, an ester or an ether with carbon number of 1 to 4. More concrete examples are methanol, ethanol, propanol, butanol, formic acid, acetic acid, propionic acid, butyric acid, formalin, acetoaldehyde, propionaldehyde, butyl aldehyde, acetone, methyl ethyl ketone, diethyl ketone, ethylene oxide, propylene oxide, butylene oxide, methyl formate, ethyl formate, methyl acetate, ethyl acetate, vinyl acetate, methyl propionate, dimethyl ether, methyl etheyl ether, and diethyl ether.

The substance capable of decomposing ammonium nitrate may be also obtained from the following sources: combustion gases produced from combustion of light-duty fuels which can be readily burned perfectly such as gaseous fuels, naphtha, kerosine, alcohols, etc.; high-temperature gases such as steam; carbon monoxide; lower hydrocarbons such as methane, ethane, propane, ethylene, propylene, etc.; or gases containing the above-said oxygen-containing derivatives.

The catalyst used in the method of this invention may be of any type if it has enough activity for reducing $NO_x$ by use of ammonia as a reducer at a temperature of from 100 to 230° C. Examples of such catalysts are manganese oxide, chromium oxide, copper chloride, platinum metals and the like. Most preferred is manganese oxide which is obtained from heat-treating manganese carbonate at a temperature of over 300° C., because this substance has an extremely high activity at a temperature of lower than 200° C. It is also recommended to use a mixture of manganese oxide with oxides of other metals such as Fe, Ni, Co, Cr, Cu, Zn, Sn, Ti, V or W as this mixture per se has an ammonium nitrate decomposability. The catalyst layer used in this invention may be either of the fixed-bed type, moving bed type or fluidized bed type.

According to the method of this invention, a $NO_x$-containing gas and ammonia are mixed by a known method and the obtained mixture gas is introduced into the catalyst layers at a temperature of from 100° to 230° C., and during this operation, an ammonium nitrate-decomposable substance such as mentioned above is introduced either constantly or intermittently into the flow of the mixture gas to the catalyst beds. Presence of the ammonium nitrate-decomposable substance in a small amount, usually not less than 1 ppm, in the mixture gas can prevent generation of ammonium nitrate. Also, if a mixture gas containing the substance is passed at the reaction temperature through the catalyst beds where ammonium nitrate has deposited, such ammonium nitrate is decomposed and the catalyst recovers its activity, so that addition of the substance into the mixture gas may be either continuous or intermittent. The temperature at which the mixture gas is passed through the catalyst beds and reacted in this invention is defined to be within the range of 100° to 230° C., but in case the ammonium nitrate-decomposable surface is supplied intermittently into the mixture gas, ammonium nitrate deposits temporarily in the catalyst beds and the catalyst bed temperature could rise above 230° C. due to the heat evolved during decomposition of the ammonium nitrate by the substance. However, even in such a case, the initial reaction of $NO_x$ and ammonia ought to take place at a temperature of not more than 230° C. at which no thermal decomposition of ammonium nitrate takes place, so that such case is also naturally embraced within the scope of this invention.

According to another aspect of this invention, a $NO_x$-containing gas and ammonia are introduced into a reactor and $NO_x$ and ammonia are reacted therein at a temperature of from 100° to 230° C. in the presence of a catalyst, wherein the introduction of the $NO_x$-containing gas and ammonia into the reactor is partially stopped temporarily and instead an ammonium nitrate-decomposable substance is introduced into the reactor during such time, and this operation is repeated successively. This method is described in detail by way of embodiments thereof while having reference to the accompanying drawings.

Figure 2:
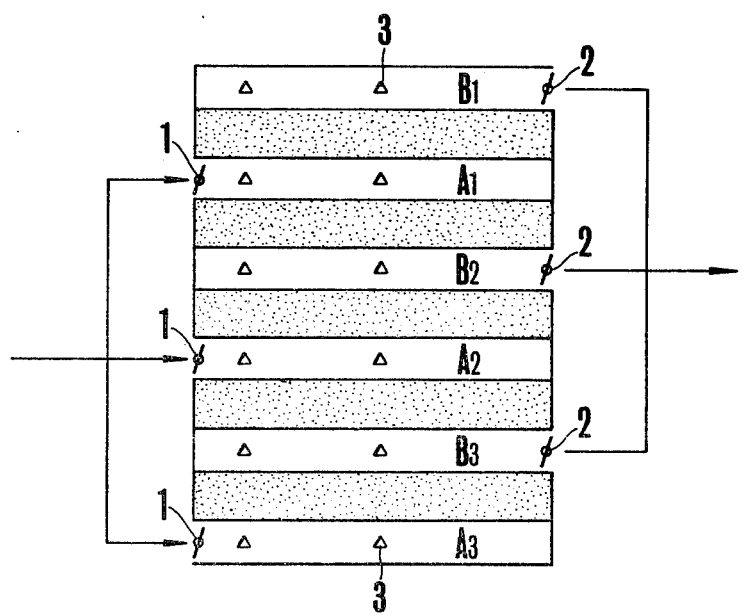
FIG. 2 is a sectional view taken along the line X–X' of FIG. 1.

Referring to the drawings, FIG. 1 shows in perspective an example of the reaction apparatus used in this invention, and FIG. 2 is a sectional view taken along the line X—X' of FIG. 1. As shown in FIGS. 1 and 2, the reaction apparatus used in this invention is provided with two or more catalyst layers C each of which is flanked by a gas introducing passage A and a gas discharging passage B. Thus, the reaction apparatus is constituted from a recurrent arrangement of gas introducing passage-catalyst layer - gas discharging passage - catalyst layer - gas introducing passage, with both extreme ends being formed with a gas introducing passage and a gas discharging passage. Preferably, when one end is a gas introducing passage, then the other end is a gas discharging passage. Each of the gas introducing passages A is provided with a door 1 such as a rotary damper (not shown in FIG. 1) at its inlet end but closed on its gas outlet side while each of the gas discharging passages B is closed on its gas inlet side and provided with a door 2 (not shown in FIG. 1) at its outlet end. Also, each of the gas passages is provided with at least one inlet port 3 for the substance capable of decomposing ammonium nitrate.

Figure 3:
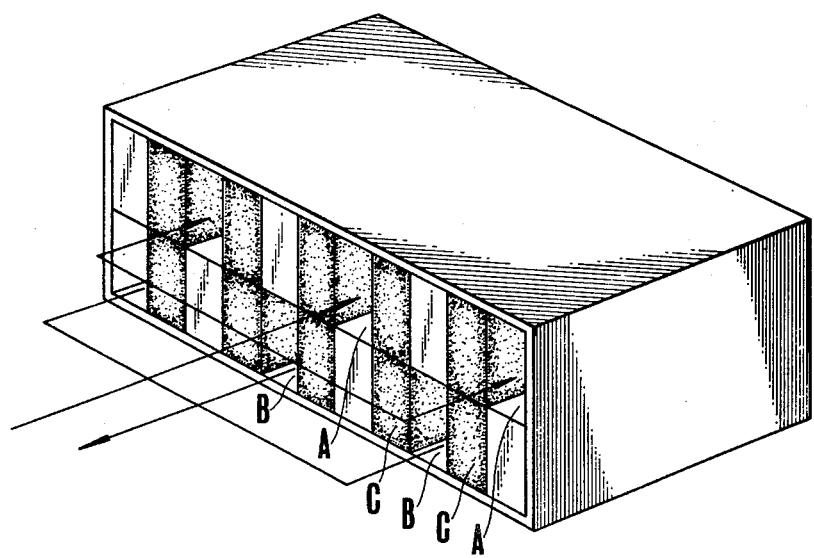
FIG. 3 is a perspective view of another embodiment of the apparatus according to this invention.

FIG. 3 shows another example of the reaction apparatus used in this invention. This example is also constituted from a recurrent arrangement of the gas introducing passage - catalyst layer - gas discharging passage - catalyst layer, with both ends being formed with a gas introducing or discharging passage, but in this example, the front side of the apparatus is partitioned in two stages such that the gas introduced into the upper stage will make a U-turn to flow out from the lower stage as shown in the drawing. As in the apparatus of FIG. 1, there are provided the doors and ammonium nitrate-decomposable substance inlet ports (both being not shown) at the gas inlets and outlets of the respective passages.

In practice of this invention, a $NO_x$-containing gas is first mixed with $NH_3$ in an amount substantially equivalent to $NO_x$ and the mixture gas is introduced into the reaction apparatus to effect catalytic reduction of $NO_x$ at a relatively low temperature, or lower than 230° C. As the reaction is continued for a long time, the by-produced ammonium nitrate deposits and gradually builds up in the catalyst layer to lower the reaction rate. When this situation occurs, a part of the doors 1 or 2 provided at the gas inlets or outlets in the reaction apparatus are closed. For instance, one or more of the doors at the inlets of the gas introducing passages and the door(s) at the outlet(s) of the corresponding gas discharging passage(s) may be closed, or only the doors at the gas inlets or only the doors at the outlets may be closed. In case of closing only the doors at the inlets, one or more (not all) of such doors are closed, and in case of closing only the doors at the outlets, one or more (not all) of the pairs of doors (every two adjoining doors being assumed as a pair) are closed. The gas flow in any particular gas passage or passages can be stopped substantially or perfectly by closing a part of the doors in the manner described above. A substance capable of decomposing ammonium nitrate is injected from the inlet port(s) 3 into the gas passage or passages where the discharge gas flow has stopped. If a combustion gas produced from combustion of a light-duty fuel or a high-temperature gas such as steam is injected as the ammonium nitrate-decomposable substance and each catalyst layer is maintained at a temperature higher than 180° C., preferably 250° to 300° C., for more than 5 minutes, the accumulated ammonium nitrate is decomposed. As the discharge gas flow stays stationary during this operation, it is possible to quickly elevate the temperature of the catalyst layers alone, allowing completion of the decomposition of ammonium nitrate in a short time. There is thus a shorter period of time and less energy for elevation of temperature than when raising the temperature while continuing the discharge gas flow.

In case of injecting carbon monoxide, an oxygen-containing hydrocarbon or a lower hydrocarbon as the ammonium nitrate-decomposable substance, such material reacts with ammonium nitrate on the catalyst to decompose it. This decomposition reaction is a sort of exothermic reaction and the temperature is raised promptly to the ammonium nitrate decomposition temperature, so that the gas temperature may be lower than the decomposition temperature, but in practice, it is not still preferable that the reaction temperature be lowered by the discharge gas. The substance may be injected singly, but it is preferred to inject it together with air or oxygen.

After completion of the decomposition of ammonium nitrate deposited in any catalyst layer, the closed doors are again opened to admit the gas into the apparatus to effectuate reduction of $NO_x$ in the gas. This is again followed by the above-said operation for decomposing ammonium nitrate accumulated in the other catalyst layer.

As reviewed above, according to the method of this invention, a $NO_x$-containing gas is introduced along with $NH_3$ into a reactor including two or more catalyst layers each of which is disposed alongside a gas introducing passage at one side and a gas discharging passage at the other side, and a substance capable of decomposing ammonium nitrate is injected into the gas passage(s) (gas introducing passage(s) and/or gas discharging passage(s)) where the gas flow has been substantially or perfectly stopped by closing a part of the gas inlet and/or outlet openings in the reactor, with such closure being effected intermittently and alternately, so as to decompose ammonium nitrate settled in each catalyst layer to thereby restore the catalyst activity without interrupting the removing reaction of nitrogen oxide.

The invention is described in further detail hereinbelow by way of some examples thereof, but it is to be understood that the scope of this invention is not limited by these examples.

EXAMPLE 1

A nitrogen gas containing 500 ppm of NO, 500 ppm of $NH_3$, 4 vol% of $O_2$ and 10 vol% of $H_2O$ was blown through a columnar catalyst (3 mm in diameter and 10 mm in length) made of a manganese oxide and the reaction was performed at temperature of 130° C. and space velocity (SV) of 5,000 $Hr^{-1}$ for the period of 100 hours. As the percentage of removal of nitrogen oxide dropped from initial 96% to 90%, vaporized methanol was supplied into the gas in a concentration of 400 ppm for three minutes. As a result, the percentage of removal of nitrogen oxide elevated to 94%. It has recovered to 96% in ten minutes after the start of methanol injection.

EXAMPLE 2

8 weight parts of the catalyst used in Example 1 was pulverized and mixed with 2 weight parts of ammonium nitrate, and 30 mg of this mixture was put into a thermobalance cell and heated to 150° C., and then air was blown thereinto at the rate of 10 ml/min. As a result, ammonium nitrate was decomposed in 28 minutes to provide a 20% weight reduction.

When air was supplied under the same conditions through a scrubbing bottle with a 300 mm deep liquid containing 10% methanol after a temperature elevation to 150° C., there took place a vehement decomposition of ammonium nitrate in 5 minutes, producing a 20% weight reduction. When the similar decomposing treatment was performed by using alumina powder instead of the catalyst, the decomposition advanced very slowly and the 20% weight reduction was reached in 58 minutes after start of the treatment. This seems to indicate that although the catalyst itself has an ammonium nitrate-decomposing capacity, methanol has an action to amazingly promote the decomposition of ammonium nitrate.

EXAMPLE 3

When the treatment of Example 2 was repeated by using acetone, formic acid, ethanol and acetoaldehyde, respectively, instead of methanol, there occurred drastic weight reduction in about 8 minutes, 4 minutes, 6 minutes and 7 minutes, respectively.

EXAMPLE 4

An exhaust gas containing 170 ppm of NO and 4% of $O_2$ was mixed with 160 ppm of $NH_3$ and then subjected to a treatment for reduction of NO at 130° C. by using the reaction apparatus shown in FIGS. 1 and 2 including the 30 cm wide catalyst beds made of a manganese oxide and 40 cm wide gas introducing passages and gas discharging passages.

As the percentage of removal of nitrogen oxide, which was initially 98.4%, was dropped to 95.8% in 150 hours after start of the reaction, the dampers in the gas introducing passage $A_1$ and in the gas discharging passages $B_1$ and $B_2$ were closed without changing the exhaust gas flow rate, and propane combustion gas was injected as the ammonium nitrate-decomposing substance. After maintaining the temperature at 230° C. for 10 minutes, the dampers were opened to resume the reaction. Then, the dampers in the gas introducing passage $A_2$ and gas discharging passages $B_2$ and $B_3$ were closed to make the similar treatment, and this was followed by closure of the dampers in the gas introducing passage $A_3$ and gas discharging passage $B_3$ for the similar treatment.

When propane combustion gas was injected in this way into all of the catalyst beds, the percentage of removal of nitrogen oxide has recovered to 98.4%.

EXAMPLE 5

When the process of Example 4 was repeated by using steam of 185° C. instead of propane combustion gas, the percentage of removal of nitrogen oxide was elevated to 98.0%.

EXAMPLE 6

Methanol-containing air was introduced instead of propane combustion gas in Example 4 such that the methanol concentration in the gas passages would be 2,000 ppm. As a result, the catalyst bed temperature elevated to 260° C. and the percentage of removal of nitrogen oxide increased to 98%.

EXAMPLE 7

When ethylene was introduced in a concentration of 250 ppm in the gas passages instead of propane combustion gas in Example 4, the catalyst bed temperature rose to 195° C. and the percentage of removal of nitrogen oxide elevated to 97%.

EXAMPLE 8

When acetone was introduced instead of ethylene in Example 7, the percentage of removal of nitrogen oxide increased to 97.8%.

What is claimed is:

1. A method for the conversion of nitrogen oxide to ammonia in the presence of a catalyst to facilitate said conversion in the catalyst system while minimizing deposition of ammonium nitrate deposition on said catalyst which comprises passing said nitrogen oxides through a system containing said catalyst at a temperature of from 100° to 230° C., and intermittently introducing into said system a sufficient amount of a substance capable of decomposing ammonium nitrate formed in said system, whereby the deposition of ammonium nitrate on said catalyst is minimized.

2. The method according to claim 1, wherein said substance capable of decomposing ammonium nitrate is an alcohol with carbon number of 1 to 4, a carboxylic acid with carbon number of 1 to 4, an aldehyde with carbon number of 1 to 4, a ketone with carbon number of 3 to 4, an oxide with carbon number of 2 to 4, an ester with carbon number of 2 to 4, or an ether with carbon number of 2 to 4.

3. The method according to claim 2, wherein said alcohol is methanol, ethanol, propanol or butanol.

4. The method according to claim 2, wherein said carboxylic acid is formic acid, acetic acid, propionic acid or butyric acid.

5. The method according to claim 2, wherein said aldehyde is formalin, acetoaldehyde or butyl aldehyde.

6. The method according to claim 2, wherein said ketone is acetone, or methyl ethyl ketone.

7. The method according to claim 2, wherein said oxide is ethylene oxide, propylene oxide or butylene oxide.

8. The method according to claim 2, wherein said ester is methyl formate, ethyl formate, methyl acetate, ethyl acetate, vinyl acetate or methyl propionate.

9. The method according to claim 2, wherein said ether is dimethyl ether, methyl ethyl ether, or diethyl ether.

10. A method of claim 1, wherein said substance is added to said system concurrently with said nitrogen oxides.

11. A method of claim 1, wherein said substance is added to said system intermittently.

12. A method for the conversion of nitrogen oxide to ammonia in the presence of a catalyst to facilitate said conversion while minimizing deposition of ammonium nitrate deposition on said catalyst which comprises passing said nitrogen oxides through a system containing said catalyst at a temperature of from 100° to 230° C., periodically halting said passing of nitrogen oxides and during the period of halting said passing introducing into said system a sufficient amount of a substance capable of decomposing ammonium nitrate formed in said system, whereby the deposition of ammonium nitrate on said catalyst is minimized.

13. The method according to claim 12, wherein said substance capable of decomposing ammonium nitrate is an oxygen-containing derivative of a lower hydrocarbon.

14. The method according to claim 13, wherein said oxygen-containing derivative is an alcohol with carbon number of 1 to 4, a carboxylic acid with carbon number of 1 to 4, an aldehyde with carbon number of 1 to 4, a ketone with carbon number of 3 to 4, an oxide with carbon number of 2 to 4, an ester with carbon number of 2 to 4, or an ether with carbon number of 2 to 4.

15. The method according to claim 14, wherein said alcohol is methanol, ethanol, propanol or butanol.

16. The method according to claim 14, wherein said carboxylic acid is formic acid, acetic acid, propionic acid or butyric acid.

17. The method according to claim 14, wherein said aldehyde is formalin, acetoaldehyde, propionaldehyde or butyl aldehyde.

18. The method according to claim 14, wherein said ketone is acetone or methyl ethyl ketone.

19. The method according to claim 14, wherein said oxide is ethylene oxide, propylene oxide or butylene oxide.

20. The method according to claim 14, wherein said ester is methyl formate, ethyl formate, methyl acetate, ethyl acetate, vinyl acetate or methyl propionate.

21. The method according to claim 14, wherein said ether is dimethyl ether, methyl ethyl ether or diethyl ether.

22. The method according to claim 12, wherein said substance capable of decomposing ammonium nitrate is a combustion gas produced from combustion of a light-duty fuel; steam; carbon monoxide; a lower hydrocarbon; or a gas containing methanol, ethanol, propanol, butanol, formic acid, acetic acid, propionic acid, butyric acid, formalin, acetoaldehyde, propionaldehyde, butyl aldehyde, acetone, methyl ethyl ketone, diethyl ketone, ethylene oxide, propylene oxide, butylene oxide, methyl formate, ethyl formate, methyl acetate, ethyl acetate, vinyl acetate, methyl propionate, dimethyl ether, methyl ethyl ether or diethyl ether.

23. The method according to claim 22, wherein said light-duty fuel is a gaseous fuel, naphtha, kerosine or alcohol.

24. The method according to claim 22, wherein said lower hydrocarbon is methane, ethane, propane, ethylene or propylene.

* * * * *

UNITED STATES PATENT AND TRADEMARK OFFICE
CERTIFICATE OF CORRECTION

PATENT NO. : 4,199,554
DATED : April 22, 1980
INVENTOR(S) : Tadashi ARAKI et al

It is certified that error appears in the above-identified patent and that said Letters Patent are hereby corrected as shown below:

In the name of the Assignee, "KAGAKI"

should read --KAGAKU--

*Signed and Sealed this*

*Twenty-ninth* Day of *July 1980*

[SEAL]

Attest:

SIDNEY A. DIAMOND

*Attesting Officer*    *Commissioner of Patents and Trademarks*